(12) United States Patent  
Zorn

(10) Patent No.: US 9,511,939 B2  
(45) Date of Patent: Dec. 6, 2016

(54) TRANSPORT DEVICE OF THE NORIA TYPE

(71) Applicant: MECATHERM, Barembach (FR)

(72) Inventor: Bernard Zorn, Saverne (FR)

(73) Assignee: Mecatherm, Barembach (FR)

( * ) Notice: Subject to any disclaimer, the term of this patent is extended or adjusted under 35 U.S.C. 154(b) by 0 days.

(21) Appl. No.: 14/899,473

(22) PCT Filed: Jul. 1, 2014

(86) PCT No.: PCT/FR2014/051693  
§ 371 (c)(1),  
(2) Date: Dec. 17, 2015

(87) PCT Pub. No.: WO2015/001254  
PCT Pub. Date: Jan. 8, 2015

(65) Prior Publication Data  
US 2016/0145047 A1   May 26, 2016

(30) Foreign Application Priority Data

Jul. 5, 2013 (FR) ...................................... 13 56601

(51) Int. Cl.  
*B65G 17/32* (2006.01)  
*B65G 17/12* (2006.01)  
*A21B 1/42* (2006.01)  
*B65G 47/57* (2006.01)

(52) U.S. Cl.  
CPC ............. *B65G 17/123* (2013.01); *A21B 1/42* (2013.01); *B65G 47/57* (2013.01)

(58) Field of Classification Search  
CPC ......... B65G 47/57; B65G 17/40; B65G 17/44; B65G 17/42; B65G 2812/02415; B65G 2812/02752

USPC ............................... 198/801, 347.1, 799, 800  
See application file for complete search history.

(56) References Cited

U.S. PATENT DOCUMENTS

| | | | | |
|---|---|---|---|---|
| 2,897,772 A | * | 8/1959 | Hunter | A21B 5/08 118/19 |
| 3,258,109 A | * | 6/1966 | Brettenstein | G07F 11/58 198/801 |
| 3,317,029 A | | 5/1967 | Goldarmmer et al. | |
| 3,830,624 A | * | 8/1974 | Sperring | A21B 1/02 432/145 |
| 3,882,832 A | * | 5/1975 | Ohsaki | F01L 1/047 123/90.17 |

(Continued)

FOREIGN PATENT DOCUMENTS

EP   0 710 441 A1   5/1996  
GB   2129451 A      5/1984

*Primary Examiner* — James R Bidwell  
(74) *Attorney, Agent, or Firm* — Andrew W. Chu; Craft Chu PLLC

(57) ABSTRACT

The transport device of the noria type includes a drive chain having links and being wound around two deflection wheels so as to describe a loop circuit. There is a first, ascending vertical chain strand and a second, descending vertical chain strand. One link of the chain holds a support arm extending in a direction perpendicular to the chain. The support arm is attached laterally to a link by a mount. The mount has a support surface at each of its ends. At least across one of these support surfaces, the mount rests on another, contiguous mount of another support arm attached to another link of the chain, on the ascending strand and descending strand.

8 Claims, 2 Drawing Sheets

(56) References Cited

U.S. PATENT DOCUMENTS

| | | | | |
|---|---|---|---|---|
| 3,908,533 A | * | 9/1975 | Fagerstrom | A21B 1/245 |
| | | | | 219/388 |
| 4,120,646 A | * | 10/1978 | Groff | A21B 1/48 |
| | | | | 126/91 A |
| 4,641,740 A | * | 2/1987 | Grecksch | B65H 67/068 |
| | | | | 198/483.1 |
| 5,255,773 A | | 10/1993 | Pollock | |
| 5,863,172 A | * | 1/1999 | Pearson | B65G 1/133 |
| | | | | 198/801 |

\* cited by examiner

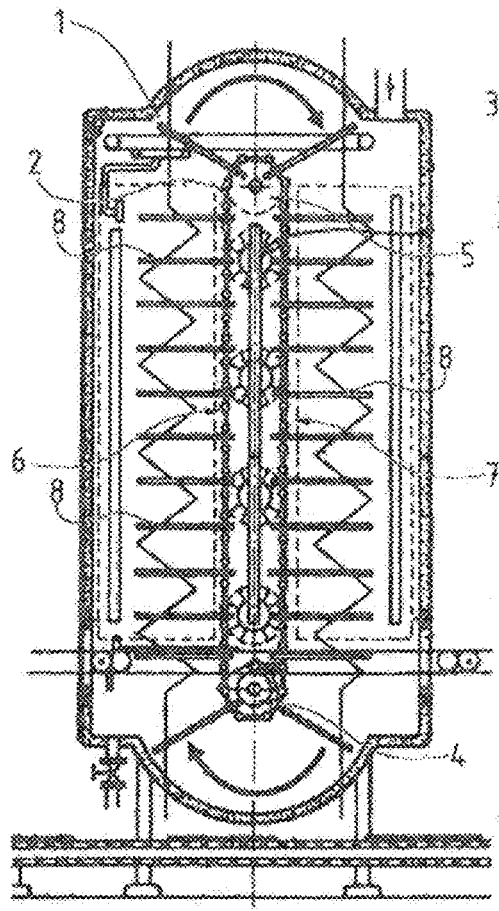

TRANSPORT DEVICE OF THE NORIA TYPE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention falls within the field of transporting and conveying products, in particular bakery products, pastries and similar products.

Such a device will be particularly, but not exclusively, applicable to the transport of products in the form of dough rolls through different lines for them to be treated, in particular for baking.

2. Description of Related Art Including Information Disclosed Under 37 CFR 1.97 and 037 CFR 1.98

Preferably, the conveying of dough rolls is done within baking ovens, in particular continuous baking ovens.

In a known manner, such ovens include a baking enclosure provided with an inlet opening and an outlet opening, crossed through by a transport device, making it possible to convey baking supports such as plates, nets or similar members on which the products to be baked rest.

More specifically, the invention targets a transport device of the noria type providing upward and downward travel of the products within the baking enclosure. Such a noria includes at least one drive chain having links, preferably a pair of chains. Each one is wound at least around two deflection wheels, to describe a loop circuit. Such a circuit then includes at least an ascending chain strand and a second, descending chain strand, both of which are vertical.

Furthermore, support arms, which extend perpendicular and on which the trays of products to be baked rest, are securely fastened on each chain. The oven then includes a column of ascending plates and a column of descending plates.

It will be noted that at the upper end of the noria, a tray supported by a pair of arms located on an ascending column is transferred to a pair of arms of the descending column, using appropriate transfer means. At the lower end, the plates travel on an appropriate horizontal conveyor and are thus withdrawn upstream by the rising column and deposited at the downstream end by the descending column.

One example of such a transport device of the noria type is described in document EP 0,710,441.

Such a design of a transport device of the noria type, on which support arms are fixed perpendicularly, causes many mechanical constraints essentially due to the weight applied on the arms by the trays loaded with products, said weight being outwardly offset relative to the vertical median axis passing through the axis of said deflection wheels. This cantilever tends to cause the arms to sag downward at the ascending and descending strands of the chain. More specifically, this offset weight pushes each link back inwardly at its lower axis and outwardly at its upper axis, deforming the vertical linearity of the chain. To offset this deformation, it is then necessary to increase the tension applied by the deflection wheels considerably and check it regularly. This higher tension causes greater driving and motor means and also causes faster wear of the different parts, whether the links of the chain or the deflection wheels.

Furthermore, it is necessary to lubricate the various parts constantly, which increases the maintenance cost of such a device.

Furthermore, aside from keeping the arms in a perpendicular direction, perfectly horizontally aligned on either side at the ascending and descending strands, it is necessary to ensure that the arms remain in the vertical plane of their respective chain. To prevent this twisting of the chains, the current devices are equipped with guide means, often doubled, in the form of centering wheels. Although such guide means prevent the chain from twisting, they create friction, increasing the wear of the links and once again requiring increasing the tension applied on the chain.

Other guide elements are added, to ensure the vertical linearity of each strand. These elements assume the form of rails or rollers that cause the same drawbacks and once again require regular lubrication.

Document GB 2,129,451 describes an example device of the noria type, comprising a mount attached on each link and bearing on the mount situated just below it. However, the mount is positioned in front of each link and the bearing is done at the front of the chain, causing mechanical cantilever stresses.

Document U.S. Pat. No. 5,255,733 describes a particular chain, whereof half of the links have a specific shape. However, such a chain does not provide any support for the links relative to one another.

Document U.S. Pat. No. 3,317,029 targets a chain provided with mounts positioned laterally, but with an S shape, the bend of which is slanted on the upper rim of the mount situated below. This solution has a junction axis of two links, which blocks the mounts, without providing support because the mounts do not rest on one another.

BRIEF SUMMARY OF THE INVENTION

The present invention aims to offset the drawbacks of the state of the art, by first proposing stiffening the chain at its ascending and descending strands, such that the offset weight of the trays supported by the arms no longer applies directly on each link of the chain, but in a single descending vertical component.

Furthermore, the invention proposes to do away with the various guide means and elements, by transposing the effects of this guidance directly to each link of the chain, in particular at its ascending and descending strands.

Thus, such a transport device, of the noria type, includes at least one drive chain having links that is wound at least around two deflection wheels so as to describe a loop circuit comprising at least a first, ascending vertical chain strand and a second, descending vertical chain strand, at least one link of said chain holding a support arm extending in a direction perpendicular to the chain. It is characterized in that a support arm is attached laterally to a link by means of at least one mount, a mount including at least one support surface at each of its ends in the travel direction of said chain, at least across one of these support surfaces, said mount rests on another, contiguous mount of another support arm attached to another link of the chain, on the ascending and descending strands of said chain, and in that each mount also includes, at each of its ends, an alignment surface for its arm in a plane along said direction, each alignment surface cooperating with another alignment surface of a following or preceding mount, at least at the ascending and descending strands, each alignment surface extending vertically, arranged at least partially in the thickness of said mount, the alignment surface being arranged by an indentation made in the thickness of the body of the mount, at each of its upper and lower rims.

More specifically, each support surface can extend horizontally toward the direction opposite said link, at least over part of the rim of its end.

Then, at the vertical strands, each mount presses on the mount situated below it, without applying pivoting force at the axis of the link on which it is pressed. The mounts then become superimposed at the rising and lowering of the chain.

Advantageously, each mount can include, at least at one end situated in the travel direction of the chain, a bevel ensuring the introduction of said mount within one of the support and/or alignment surfaces of another contiguous mount.

Thus, after passing around the deflection wheels, the mounts are realigned, in order to perform the aforementioned vertical bearing. The chains strands are then perfectly vertical, without risk of twisting, the arms being perfectly aligned in the alignment plane of their respective chain.

Furthermore, according to still other alternative feature, starting from the alignment position of two links, said device can comprise means for blocking the pivoting of said two contiguous links, in the direction opposite the winding direction of said chain.

According to a first embodiment, said blocking means can comprise at least one stop secured to each link against which at least one stop surface provided inside a mount becomes blocked.

According to another embodiment, said blocking means can comprise a single stop secured to each link, in the form of a pin protruding laterally, against which the stop surfaces provided inside two contiguous mounts are blocked.

According to still another embodiment, said blocking means can be made up of a stop surface provided at each end of a mount, said stop surface cooperating with another stop surface of another contiguous mount.

According to still another different embodiment, said blocking means can be made up of a stop rim with which each mount is outwardly provided over part of its height, said stop rim bearing against the outer face of the link secured to said mount.

This blockage by different types of stops ensures that the arms will remain completely horizontal, completely straight, without risk of pivoting the link on which they are subjected.

BRIEF DESCRIPTION OF THE SEVERAL VIEWS OF THE DRAWINGS

Other features and advantages of the invention will emerge from the detailed description below of non-limiting embodiments of the invention, in reference to the appended figures.

FIG. 1 shows a diagrammatic vertical sectional view of an example continuous baking oven, with vertical movement, equipped with a transport device of the noria type according to the invention.

FIG. 2 shows a diagrammatic view, in three-quarters rear perspective view, of a detail of a first embodiment of such a device, showing two contiguous mounts bearing on one another at one of the vertical strands, ascending or descending, of the chain.

FIG. 3 shows a diagrammatic elevation view of a chain of the device during its passage around the upper deflection wheel, showing the separation of the mounts before their realignment and their return to bearing at the descending strand.

DETAILED DESCRIPTION OF THE INVENTION

Figure 4:
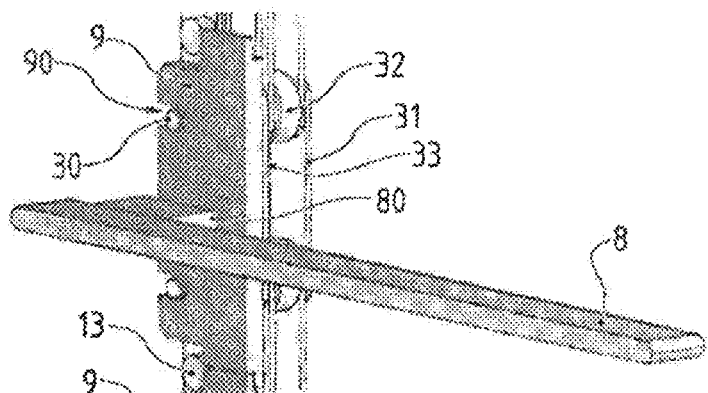
FIG. 4 shows a diagrammatic, three-quarters front perspective view, of the detail of the embodiment of FIG. 3, showing two contiguous mounts bearing on one another.

The present invention relates to a device 1 for transporting bakery products, pastries or similar products.

Essentially, such a device 1 is of the noria type. Furthermore, non-limitingly, it includes at least one drive chain 2 having links 3, but may include several such chains.

To that end, preferably, each link 3 is mounted articulated with two adjacent links, a previous one and a following one relative to the movement direction of said chain 2. This articulation is done through at least one rotation axis 30 crossing through the platens 31 making up each link 3. Said axis 30 can also cooperate within bushes making up the spacer of said links 3. Such an articulation ensures the free pivoting of the links 3 relative to one another, as specifically shown in FIG. 3.

According to the preferred embodiment, each link 3 can also comprise rolling means, in the form of washers or rollers, with a globally cylindrical shape 32, mounted freely rotating around each axis 30. As shown in FIG. 2, a pair of washers or rollers 32 is mounted freely rotating on each axis 30, such washers 32 being coaxial and separated by at least one central platen 33. These rollers 32 in particular ensure rolling along a vertical guide.

Furthermore, the chain 2 becomes wound around at least two deflection wheels, preferably two. According to the preferred embodiment shown in FIG. 1, the chain 2 winds around a lower wheel 4 and an upper wheel 5. It will be noted that at least the upper wheel 5 can then be the drive wheel, its drive means driving the chain 2 and ensuring the placement in circulation of said device 1.

To that end, the chain 2 is arranged to described a loop circuit including at least a first ascending chain 2 strand 6 and a second descending chain strand 7. These two strands 6, 7 correspond to the chain portions 2 situated between the wheels 4, 5 and extending vertically. These strands 6, 7 are therefore vertical. Furthermore, said circuit is said to be a loop circuit due to the continuity of its chain 2, forming a loop, traveling "endlessly".

According to another feature, at least one link 3 of said chain 2 receives a support arm 8. Preferably, every other link receives a support arm 8, as shown in FIG. 3. Thus, arms 8 are positioned at regular intervals all along said chain 2.

Such arms 8 extend in a direction perpendicular both to the chain 2 and to the axes 30 of the links 3 of the chain 2. Thus, at the strands 6, 7, the arms extend horizontally or substantially horizontally, as shown in FIG. 1, but also in the vertical plane passing through said two strands 6, 7 of the chain 2. At the wheels 4, 5, said arms follow the travel and rotation of said links 3, to extend radially relative to the axis of said wheel 5, 4 or orthogonally to the tangent of the trajectory followed by said chain 2 when it winds around one of the wheels 4, 5.

Furthermore, in the case of two chains 2, the arms 8 of a first chain are positioned and their movements are synchronized, such that they are perfectly horizontally aligned with the arms of the second chain, the latter then describing an identical circuit, with equal driving speeds.

Advantageously, the device 1 is characterized by the fact that a support arm 8 is laterally attached on a link 3 using at least one mount 9. In particular, each arm 8 can be welded to the body of a single mount 9 via an intermediate part 80, offsetting said arm 8 laterally and horizontally. This fastening of the intermediate part 80 is done on the face opposite the face cooperating on one side of its link 3.

Furthermore, said mount 9 is subjected to a link 3, in particular at its axes 30. To that end, according to the preferred embodiment, within the body of said mount 9, at the outer edge situated opposite the direction of said arms 8, two orifices 90 are arranged that are crossed through by the end of each of the axes 30 of said link 3. Each orifice 90 can be provided to be oblong, open at the rim 91 of the edge. This configuration is particularly visible in FIG. 6, where the rim 91 is situated in the rear, on the side of the chain 2, while the arms 8 extend on the other side, toward the outside. The through end of said axes 30 can be provided to be threaded, so as to receive nuts ensuring the blocking of the mount 9, then secured to its link 3.

Furthermore, each mount 9 comprises a body that can be made up of a single element, in the form of a plate, having a length at least equal to that of its link 3, preferably approximately equivalent to the length of two links 3. Furthermore, the mount 9 can be centered, such that it protrudes at each end of its link 3, partially overlapping, preferably at least half, each of the adjacent links.

According to one essential feature of said device 1, it is provided that at the strands 6, 7, when the chain 2 is vertical on these respective portions, said strands 6, 7 are stiffened and the cantilever effect applied by the arms 8 is limited. Furthermore, the invention also considers limiting the tension applied by the weight of the arms 8, empty or loaded. To that end, the mounts 9 are designed and configured to be stacked, and thus to form a superposition bearing on one another. This stack of mounts 9 then forms a vertical rod, transposing the weight toward the mount situated at the very bottom, at the lower deflection wheel 4. It is then at this wheel 4 that this conjugated weight of all of the mounts 9 of each of the two strands 6, 7 is passed on and supported. The cumulative weight of the ascending strand 6 then encounters the cumulative weight of the descending strand 7, situated on the other side.

Thus, a mount 9 includes at least one support surface 10 at each of its ends in the travel direction of said chain 2. Furthermore, at least through one of these support surfaces 10, said mount 9 rests on another contiguous mount of another support arm attached on another link of the chain 2, only at the ascending 6 and descending 7 strands of the chain 2.

In sum, the cooperation of the support surfaces 10 of two adjacent mounts 9 only takes place at the moment of the circuit where the chain 2 is vertical.

According to the preferred embodiment, each support surface 10 is provided to be horizontally or substantially horizontally planar. However, such a surface 10 can also be provided to be inclined, or with male and female parts, or even with teeth, authorizing reciprocal cooperation with the female and male parts, or even the corresponding toothing, of the adjacent mount. Thus, relative to the travel direction shown in FIGS. 1 and 3, at the ascending strand 6, a mount rests on the preceding mount, while at the descending strand 7, a mount rests on the following mount, still by bearing at their respective surfaces 10.

Alternatively, these support surfaces 10 also limit the cantilever of the arms 8. To that end, each support surface 10 can extend horizontally toward the direction opposite said link 3, at least over part of the rim of its end. In sum, each support surface 10 is situated off-centered or offset, toward the outside, relative to the link 3 on which its mount 9 is attached. It will be understood that this offset is necessary to counter the pivoting applied at the axes 30, but also still to allow the rotation of the links 3, at the wheels 4, 5, as shown in FIG. 3, where the support surfaces 10 are offset and off-centered to the right.

According to one additional feature, the device 1 provides for preventing the chain 2 from twisting on itself.

To that end, each mount 9 also includes, at each of its ends, an alignment surface 11 for its arm 8 in a plane along said direction, i.e., perpendicular to the chain 2, or horizontally toward the outside and in the plane of said chain 2 and its two strands 6, 7.

Furthermore, each alignment surface 11 cooperates with another alignment surface of a following or preceding mount, at least at the ascending 6 and descending 7 strands.

Then, in cooperation, the alignment surfaces 10 ensure that two mounts 9 are situated in the same plane, their two bodies being perfectly aligned, flat.

According to the preferred embodiment, each alignment surface 11 extends vertically, arranged at least partially in the thickness of said mount 9.

Figure 5:
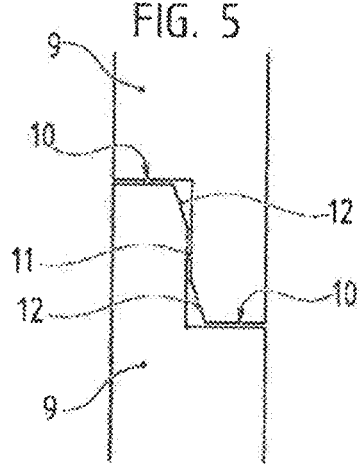
FIG. 5 shows a diagrammatic view, in vertical longitudinal section, of a detail of FIG. 4, showing the bearing of two contiguous mounts.

According to the embodiment shown in FIGS. 4 and 5, the alignment surface 11 is formed by an indentation produced in the thickness of the body of the mount 9, at each of its upper and lower rims. At the upper rim, the indentation is turned toward the link 3, whereas it is in opposition at the lower rim, turned toward the arm 8. Two adjacent mounts 9 cooperate with one another at these recesses thus produced, in particular by nesting according to the rotation applied at the deflection wheels 4, 5.

To that end, to facilitate this meshing of the mounts with one another, each mount 9 includes, at least at one end situated in the travel direction of the chain, a bevel 12 ensuring the insertion of said mount 9 within one of the bearing 10 and/or alignment 11 surfaces of the other contiguous mount. This bevel 12 consists of an inclined face connecting the rim with the alignment surface 11.

Thus, the mounts cannot collide with one another and the incline of said bevel 12 ensures the slipping and guiding of these parts for their perfectly aligned cooperation. This insertion is done at each of the lower 4 and upper 5 deflection wheels, the latter being shown in FIG. 3 during this fitting or assembly step.

FIG. 5 shows a vertical cross-section of this first preferred embodiment, at the ends of two adjacent mounts 9, stacked in the bearing position, showing the support surfaces 10 and the alignment surfaces 11, in cooperation with one another. One can clearly see that the surfaces 10 of the mounts 9 bear on one another, while the alignment surfaces 11 cooperate flat both against one another.

According to still another additional feature, the invention provides for improving the stiffened aspect of the chain 2 at its vertical strands 6, 7. More specifically, it is provided to prevent the rotation at least in one direction of the links 3 relative to one another at these vertical portions of the chain 2, while authorizing their pivoting at the deflection wheels 4, 5.

To that end, starting from the alignment position of two links 3, the device 1 comprises means for blocking the pivoting of said two contiguous links 3, in the direction opposite the winding direction of said chain 2. In sum, in the embodiment shown with a clockwise advancement direction, said blocking means prevents each link 3 from pivoting on the shared axis 30 relative to one of the adjacent links in that same clockwise direction, but allows counterclockwise rotation. Thus, it is not possible to bear on the chain 2 from the outside toward the inside of the device 1, this chain position 2 being blocked. However, it is possible to push it from the inside toward the outside.

Different embodiments of the blocking means can be considered.

First, said blocking means comprise at least one stop 13 secured to each link 3 against which at least one stop surface 14 inwardly provided in a mount 3 becomes blocked. In this configuration, the stop 13 is attached to the link 3 and the mount 9 bears against said stop 13.

According to the embodiments shown in the figures, said blocking means comprise a single stop 13 secured to each link 3, in the form of a pin protruding laterally, against which the stop surfaces 14 become blocked that are provided inwardly in two contiguous mounts 9. In sum, it is the intermediate link, which does not support a mount 9, that receives this pin protruding on the side where said two mounts 9 are fastened of its two adjacent links. This pin receives, by bearing, the front or rear edge of these two mounts 9, said rear rim then constituting the stop surface 14 of each mount 9.

Figure 6:
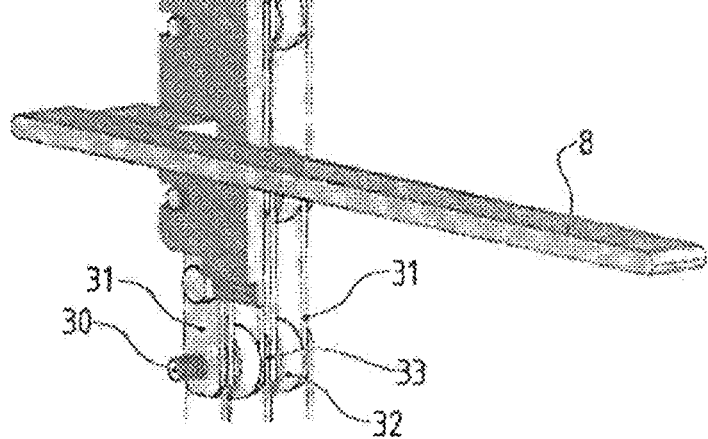
FIG. 6 is a diagrammatic three-quarters rear perspective view showing another embodiment of a stop surface of two contiguous mounts bearing on one another.

According to another embodiment, shown in FIG. 6, said blocking means are made up of a stop surface 14 with which each end of a mount 9 is provided, said stop surface cooperating with another stop surface 14 of another contiguous mount 9.

More particularly, the stop surfaces 14 can be arranged at other support 10 and alignment 11 surfaces. To that end, said stop surfaces 14 can consist of a notch, arranged along the width of the body of each mount 9, that of the upper or preceding mount being arranged at the lower end toward the rear, while that of the lower or following mount is arranged toward the rear. It is then the vertical faces of each notch which, by bearing against one another, ensure the inward blocking effect.

According to another considered configuration, said blocking means are made up of a stop rim 15 provided outwardly on each mount 9 over part of its height. Said stop rim 15 bears against the outer face at least of the link secured to said mount 9.

Figure 7:
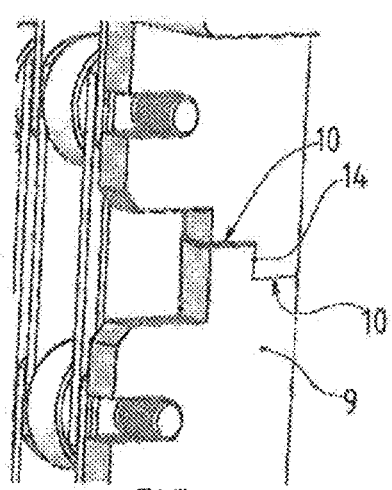
FIG. 7 shows a diagrammatic schematic view similar to FIG. 4 of another embodiment of the blocking means made up of the stop rim of a mount.

As shown in FIG. 7, several stop rims 15 are arranged along the outer or front rim of a mount 9. These different rims then bear against the link 3, or against the adjacent link, which does not include a mount 9.

Figure 8:
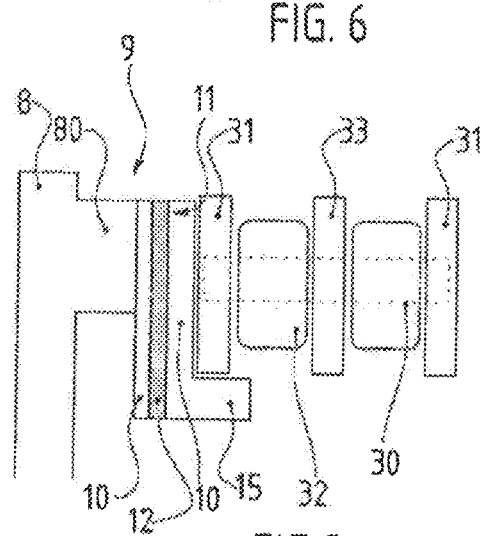
FIG. 8 shows a diagrammatic cross-sectional view of FIG. 7.

As shown in FIG. 8, the stop rim 15 is made up of an indentation extending orthogonally relative to the plane containing the body of the mount 9. It protrudes from the side of the link 3 and then bears, at its inner face, against the edge of the platens 31 and 33, preferably only that of the platen 31 situated on the side of the mount 9.

Furthermore, these stop rims 15 can be situated at each axis 30, extending vertically across from and on either side of the latter.

Thus, the noria device 1 according to the invention makes it possible to stiffen the chain 2 at its vertical strands 6, 7, while allowing the upper and lower winding around deflection wheels 4, 5. The stacking bearing, the alignment and the blocking thus imparted ensure that the arms 8 extend completely horizontally, without sagging, or being angularly offset relative to the plane containing said chain 2, i.e., the plane passing through its two strands 6, 7.

This rigid chain 2 makes it possible to eliminate many guide means and elements, decrease the tension applied to said chain 2 and lighten the motor means. Furthermore, adjustments are easier to do, for less maintenance, in particular less lubrication.

I claim:

1. A transport device of the noria type, comprising:
   at least one drive chain having links and being wound at least around two deflection wheels so as to define a loop circuit, said loop circuit comprising at least a first, ascending vertical chain strand, and a second, descending vertical chain strand; and
   a support arm held by at least one link of the chain, said support arm extending in a direction both perpendicular to the chain and to axes (30) of the links,
   wherein said support arm is attached laterally on a link by at least one mount, each mount being comprised of ends, each end having at least one support surface in a travel direction of the chain,
   wherein said mount rests on another contiguous mount at least across one of the support surfaces, said another contiguous mount of another support arm attaching to another link of the chain, on the ascending and descending strands of the chain, each mount having an alignment surface on each end for said support arm in a plane along said direction, each alignment surface cooperating with another alignment surface of said another mount, at least at the ascending and descending strands, each alignment surface extending vertically, arranged at least partially in a thickness of said mount, and
   wherein said alignment surface is arranged by an indentation in a thickness of a body of the mount, at each of its upper and lower rims.

2. The transport device according to claim 1, wherein each support surface extends horizontally toward a direction opposite said link, at least over part of a rim of its end.

3. The transport device, according to claim 1, wherein each mount comprises, at least at one end situated in the travel direction of the chain, a bevel ensuring introduction of said mount within one of a group consisting of: support surfaces and alignment surfaces of another contiguous mount.

4. The transport device, according to claim 1, wherein, starting from alignment position of two links, the device comprises means for blocking a pivoting of said two contiguous links, in a direction opposite a winding direction of the chain.

5. The transport device, according to claim 4, wherein said means for blocking comprise at least one stop secured to each link against which at least one stop surface is provided inside a mount becoming blocked.

6. The transport device, according to claim 5, wherein said blocking means comprise a single stop secured to each link, said single stop being comprised of a pin protruding laterally, against which the stop surfaces provided inside two contiguous mounts are blocked.

7. The transport device, according to claim 4, wherein said blocking means are made up of a stop surface provided at each end of a mount, said stop surface cooperating with another stop surface of another contiguous mount.

8. The transport device, according to claim 4, wherein said blocking means comprises: a stop rim with which each mount is outwardly provided over part of its height, said stop rim bearing against an outer face of the link secured to said mount.

\* \* \* \* \*